(12) United States Patent
Hendricks et al.

(10) Patent No.: US 6,625,278 B1
(45) Date of Patent: Sep. 23, 2003

(54) IMPEDANCE MATCHING WITH SIGMA DELTA FILTER

(75) Inventors: Paul D. Hendricks, Coopersburg, PA (US); Donald R. Laturell, Allentown, PA (US); Lane A. Smith, Easton, PA (US); Steven B. Witmer, Spring Township, Berks County, PA (US)

(73) Assignee: Agere Systems Guardian Corp., Allentown, PA (US)

( * ) Notice: Subject to any disclaimer, the term of this patent is extended or adjusted under 35 U.S.C. 154(b) by 0 days.

(21) Appl. No.: 09/379,603

(22) Filed: Aug. 24, 1999

(51) Int. Cl.[7] .................. H04M 1/00; H04M 9/00; H04M 7/04
(52) U.S. Cl. .................. 379/398; 379/394; 379/399.01
(58) Field of Search .................. 379/390.02, 390.03, 379/394, 388.03, 395.01, 398, 399.01, 413, 413.02, 406.06, 406.08

(56) References Cited

U.S. PATENT DOCUMENTS

| | | | | |
|---|---|---|---|---|
| 4,612,585 A | * | 9/1986 | Takase et al. | 358/316 |
| 4,899,382 A | * | 2/1990 | Garner | 379/413 |
| 5,500,894 A | * | 3/1996 | Hershbarger | 379/399 |
| 5,654,984 A | * | 8/1997 | Hershbarger et al. | 375/257 |
| 5,881,129 A | * | 3/1999 | Chen et al. | 379/5 |
| 6,181,792 B1 | * | 1/2001 | Derby et al. | 379/398 |
| 6,185,280 B1 | * | 2/2001 | Jarboe et al. | 379/3 |
| 6,192,109 B1 | * | 2/2001 | Amrany et al. | 379/30 |
| 6,198,817 B1 | * | 3/2001 | Derby et al. | 379/394 |
| 6,212,273 B1 | * | 4/2001 | Hemkumar et al. | 379/410 |
| 6,282,176 B1 | * | 8/2001 | Hemkumar | 370/276 |

* cited by examiner

*Primary Examiner*—Binh Tieu
(74) *Attorney, Agent, or Firm*—William H. Bollman

(57) ABSTRACT

An AC impedance matching architecture which provides programmable AC impedance matching in a given range using a digital filter to filter a signal fed back from the impedance matched line to generate an AC impedance emulation control signal. The AC impedance emulation control signal is combined with a transmit signal (if desired) and drives a voltage controlled current source, which is in parallel with a reference impedance. A voltage is developed across the reference impedance to drive, e.g., the telephone line. The reference impedance is chosen based on a desired maximum AC impedance. The gain of the digital filter, a first order sigma delta filter in the disclosed embodiment, is chosen based on the desired value of the AC impedance. The transfer function of the digital filter is derived based on a desired AC impedance.

21 Claims, 2 Drawing Sheets

IMPEDANCE MATCHING WITH SIGMA DELTA FILTER

BACKGROUND OF THE INVENTION

1. Field of the Invention

This invention relates generally to impedance matching circuits. More particularly, it relates to the use of a digital filter such as a sigma delta filter to provide a programmably adjustable AC impedance matching circuit.

2. Background of Related Art

Impedance matching is important in many applications, most notably in matching the impedance of a telephone device such as a modem or a telephone line interface and telephone connected to a telephone line, with a central office at the other end of the telephone line.

To maximize the signal to noise ratio of customer premises equipment attached to a telephone line, e.g., the voltage level, it is desired that the impedance of the customer premises equipment match the impedance of the central office.

Impedance matching in this disclosure refers to image impedance matching. It is desirable to match impedances as required by the various countries. Moreover, it is also desirable to maximize return loss, e.g., to greater than 20 decibels (dB).

AC impedance includes reactive elements which cause the frequency components of the transmitted signal to vary. To maximize return loss, the AC termination impedance of a telephone line interface should be the same as the AC termination at the telephone company central office. This is commonly known as an image match. However, as evidenced by numerous standards throughout the world, AC terminations vary between telephone company central offices throughout the world.

To accommodate the numerous standards throughout the world, conventional telephone or modem devices switch in external components to match the impedance in the particular country. However, this technique requires the inclusion of components which likely may not be used when the equipment is installed in any particular country. These extra components increase costs, decrease overall reliability of the device, and cause difficulties in manufacture for worldwide marketplace.

There is a need to simplify the design of a telephone line interface for both a telephone and/or a modem device in a way that simplifies manufacturing concerns in a worldwide marketplace, and which reduces overall costs.

SUMMARY OF THE INVENTION

In accordance with the principles of the present invention, an AC impedance matched circuit comprises a digital filter including a transfer function based on a desired output AC impedance. A voltage controlled current source is controlled by an output of the digital filter. A reference impedance is in parallel with the voltage controlled current source.

A method of matching AC impedance in accordance with another aspect of the present invention comprises digitally filtering an output signal using a transfer function based on a desired AC impedance. A voltage controlled current source is controlled with the digitally filtered output. A voltage is developed across a reference impedance with the current output from the voltage controlled current source.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides an architecture which provides programmable AC impedance matching in a given range. Although the disclosed embodiments relate to a telephone line interface circuit between a device such as a modem and a telephone line from a central office, the principles of the present invention relate generally to impedance matching in general even outside telephone technology.

Figure 1:
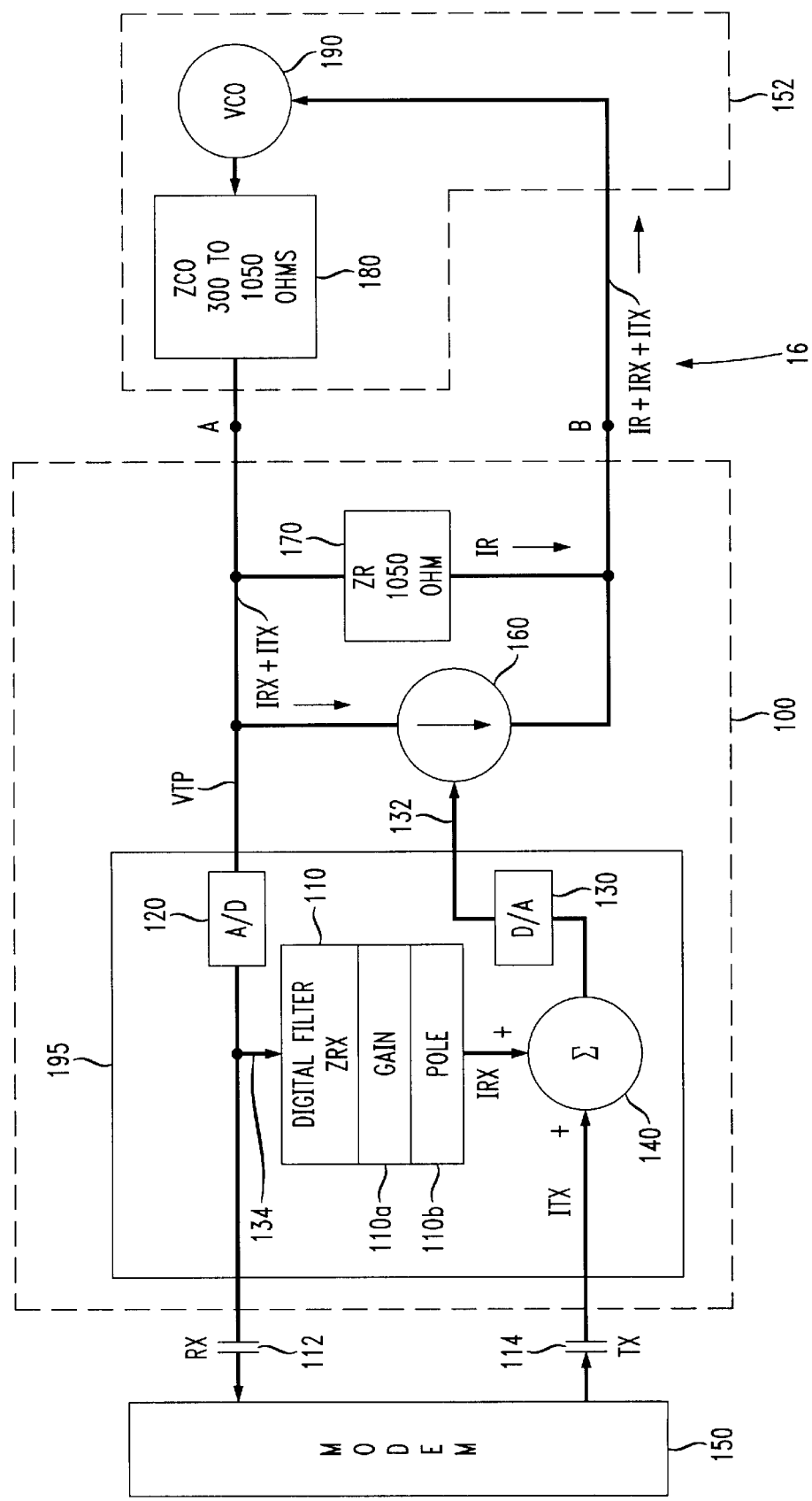
FIG. 1 shows an exemplary signal flow diagram for a telephone line interface including a first order sigma delta filter included within an integrated circuit including an analog-to-digital (A/D) converter and a digital-to-analog (D/A) converter, in accordance with the principles of the present invention.

In a disclosed embodiment shown in FIG. 1, a telephone line interface circuit includes a programmable digital filter, e.g., a sigma delta filter (sometimes alternatively referred to in the art as a delta sigma filter) in a way which controls a voltage controlled current source to emulate an AC impedance in a given range, e.g., between 300 and 1050 ohms.

It has been known to control a voltage controlled voltage source using analog or digital feedback from the output, e.g., from the central office in a telephone application, but these conventional systems have certain limitations and drawbacks. For instance, use of a voltage controlled voltage source requires wasteful and inefficient voltage overhead, and complicates a signal flow, making tasks such as division somewhat inconvenient.

The present invention overcomes these conventional limitations by controlling a voltage controlled current source with a digital filter, e.g., a sigma delta filter, having a transfer function that results in the desired AC impedance. The digital filter and voltage controlled current source provide repeatable, reliable AC impedance matching with a simple flow diagram.

While the disclosed embodiments relate to the use of a first order sigma delta filter to control the AC impedance, the principles of the present invention relate equally to higher order sigma delta filters, and single and multi-bit digital filters in general.

The disclosed embodiment relates to a first order sigma delta filter used to provide programmable AC impedance to a telephone line. The sigma delta filter in accordance with the principles of the present invention adjusts the AC impedance seen by the telephone line without the need to wastefully switch selected components in or out as in conventional devices intended for use in any of a plurality of countries. However, the principles of the present invention relate equally to the use of second or higher order sigma delta filters.

In accordance with the principles of the present invention, the gain and/or pole of the transfer function of the sigma delta first order filter are adjusted to maximize the return loss for the desired AC termination for the requirements of any particular country. In this way, a common telephone line interface can be manufactured in products intended for use in any of a variety of countries, and configured under software control to emulate the necessary AC impedance for the central office in the country in which the telephone or modem device is operated.

FIG. 1 shows an exemplary signal flow diagram for a telephone line interface 100 including a digital filter, e.g., a first order sigma delta filter 110. Included with the digital filter 110 on an integrated circuit 195 (such as that forming a digital signal processor (DSP)) may be, e.g., an analog-to-digital (A/D) converter 120, a digital-to-analog (D/A) converter 130, and a digital signal summer 140.

Importantly, in accordance with the principles of the present invention, a voltage controlled current source 160 is controlled by a signal 132 comprised both of the desired transmitted signal ITX output from, e.g., a modem 150, but also with an AC impedance emulation control signal IRX output from the digital filter 110. In the example circuit of FIG. 1, the digital filter 110 provides the AC impedance emulation control signal IRX based on a feedback signal 134 feedback from the central office 152.

In accordance with the present invention, the transfer function of the digital filter 110, i.e., the gain 110*a* and/or the pole 110*b* of the digital filter 110 can be preset or programmably tuned by a processor, e.g., from the modem 150 or other internal or external device, to provide the desired AC impedance matching emulation.

In the example shown in FIG. 1, the telephone line interface 100 provides an interface between a modem 150 and a telephone line 16 to a central office 152. Of course, those of ordinary skill in the art would appreciate that the principles of the present invention relate equally to the interface of any equipment to a telephone line, e.g., a telephone, a fax machine, etc.

Moreover, the digital filter 110 shown in FIG. 1 preferably controls only AC impedance and not DC resistance.

As shown in the example of FIG. 1, the interface between the integrated circuit 195 and the modem is digital, e.g., using 1-bit sigma delta digital paths 112, 114, which by depiction in FIG. 1 are AC coupled.

The voltage controlled current source 160 may be any suitable device which provides a constant current based on a voltage level applied to a control line thereof. For instance, a transistor with appropriate feedback to monitor the current would be suitable if arranged in a prescribed way to appear as a current source as is known by those of ordinary skill in the art. The A/D converter 120 and D/A converter 130 are shown in FIG. 1 for explanatory purposes only to show a separation between analog and digital portions with respect to the digital filter 110. In the disclosed embodiment, the A/D 120 and D/A 130 function in their normal capacities to convert signals to and from the device being serviced, e.g., to and from the modem 150. In accordance with the principles of the present invention, the AC impedance emulation control signal IRX is merely impressed or superimposed upon the otherwise conventional transmit signal ITX to provide both a transmit signal component ITX and an AC impedance emulation control component IRX to the voltage controlled current source 160.

In FIG. 1, it is desired that the impedance of the central office be matched by the parallel combination of ZRX and ZR. In this case, VTP will be equal to the ideal condition of VCO/2 for all signals received from the central office 152.

In an alternative embodiment of the invention, the digital filter 110 can match the impedance of the central office 152 without the use of the reference impedance ZR 170.

Impedance emulation using the sigma delta filter 110 is preferred over implementation of impedance matching in a processor such as a digital signal processor in the modem 150 because delays associated with transmission of data to and from the modem 150 make such impedance matching impractical.

To show that the tip voltage VTP is equal to VCO/2 (but for the impressed transmit signal and the impedance of the central office) proving that the present invention indeed does provide a very desirable AC impedance matching, the tip voltage VTP is calculated as follows, wherein:

ZR is the reference impedance which provides a partial solution to the AC impedance matching. It can be called a "helper impedance" in that it is the impedance on which the current output from the voltage controlled current source 160 acts. The reference impedance ZR allows the tip voltage VTP to be developed and fed back to the digital filter 110, e.g., through the A/D converter 120, forming a closed loop (albeit with positive feedback). The gain can be greater than 1. As the current increases, the voltage decreases on the TIP (i.e., to the central office), resulting in negative feedback. Preferably, the reference impedance ZR will be approximately equal to the highest matching impedance value necessary, but of course can be of a larger value.

ZRX is the resultant AC impedance of the equipment. The emulated AC impedance ZRX is represented in FIG. 1 across points A and B if the central office 152 were removed from the figure.

ZCO is the AC impedance of the central office 152.

VTP is the tip voltage.

VT is the voltage developed due to the current ITX of the transmit signal, e.g., from the modem 150.

VCO is the voltage impressed or produced by the central office 152.

IR is the current through the reference impedance ZR.

IRX is the portion of the tip/ring current produced by the voltage controlled current source 160.

ITX is the portion of the tip/ring current produced by the transmit signal, e.g., output from the modem 150.

$$ZRX \| ZR = ZCO$$

$$ZCO = (ZRX*ZR)/(ZRX+ZR)$$

$$ZRX = (ZCO*ZR)/(ZR-ZCO)$$

$$ZRX = 1/(1/ZR - 1/ZCO)$$

$$IRX = VTP/ZRX$$

$$IR = VTP/ZR$$

Solving for *VTP*:

$$VTP = VCO - (IRX + ITX + IR)*ZCO$$

$$VTP = VCO - (VTP(1/ZCO - 1/ZR)*ZCO + ITX*ZCO + VT/ZR*ZCO) + VCO$$

$$VTP = (VCO - ITX*ZCO)/2$$

This last equation, accordingly, shows that the tip voltage VTP indeed does provide the ideal condition of VCO/2, with only the transmit signal current ITX and impedance ZCO of the central office 152 remaining in the equation.

In accordance with the principles of the present invention, the first order sigma delta filter 110 has a programmable gain 110*a* and a programmable pole 110*b*. The programmable gain 110*a* and/or the programmable pole 110*b* are used to affect the AC impedance to the telephone line, and therefore implement the AC impedance ZRX.

All functions should be taken into account when determining the values for the particular digital filter to provide the desired overall impedance ZRX. For instance, as shown below in the exemplary transfer functions of the first order sigma delta filter 110, the AC impedance ZRX is provided taking into account the separate transfer functions of a number of different aspects of an exemplary digital filter. Of course, the particular transfer functions to take into account to provide an overall AC impedance in given a particular application will vary, in accordance with the principles of the present invention.

$$ZRX = \left( \frac{1}{Haaf * Had * Hrx * Hsum * Hda * Halp * Hlm} \right)$$

wherein, in the given disclosed example:
- Haaf=The anti alias filter.
- Had=The switched capacitor A/D.
- Hrx=Impedance Emulation Filter RX.
- Hsum=Sigma Delta Summer
- Had=Switched Capacitor D/A
- Halp=Low Pass Smoothing Filter
- Hlm=Line Modulator (Voltage Controlled Current Source)

The transfer function of the impedance emulation digital filter 110 in the z domain is calculated as follows:

$$Hrx = \frac{1 - zero * z^{-1}}{1 - pole * z^{-1}} * calcgain$$

The only variable in the equation for ZRX is Hrx, which is the first order sigma delta filter 110. An additional preference for Hrx is that the transfer function has a loss of at least, e.g., 20 dB at DC to provide AC only impedance matching, leaving DC resistance calculation to be computed elsewhere.

To assure that Hrx has loss at DC, the filter zero is set at 1 (on the unit circle). This leaves the only variables in the impedance matching of ZCO as the pole and gain of Hrx. For instance, to provide 300 ohm AC impedance matching, the gain is made equal to calcgain×300.

Figure 2:
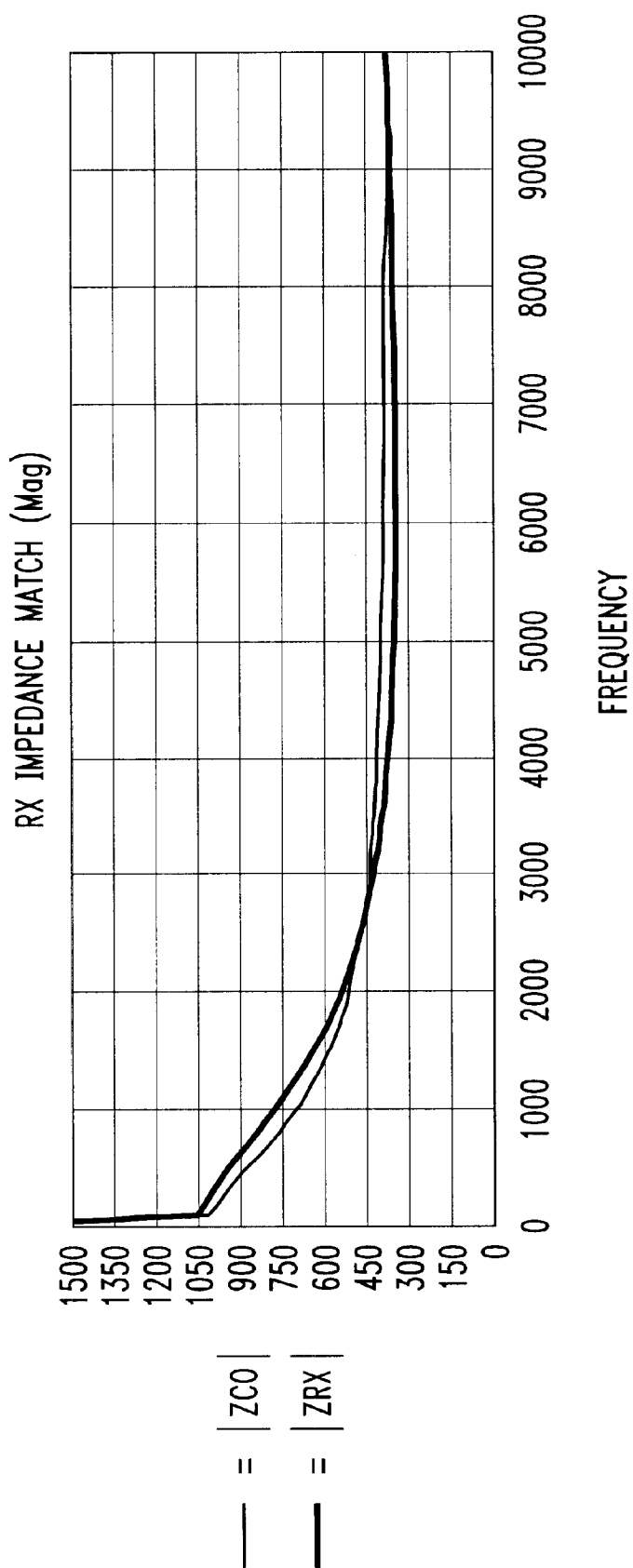
FIG. 2 shows the frequency response of a first order sigma delta filter, e.g., as shown in FIG. 1, as it matches the load of the central office.

FIG. 2 shows how well the use of a digital filter to control a voltage controlled current source to provide AC impedance matching in accordance with the principles of the present invention works.

In particular, in FIG. 2, frequency of an exemplary transmit signal is plotted on the x-axis. The impedance of the central office ZCO is plotted along the Y-axis using a thin solid line, while the AC matched impedance ZRX is plotted along the Y-axis using a thicker solid line. It is clearly seen that the AC matched impedance ZRX follows quite closely as it matches the load of the central office 152.

While the present invention has been described with reference to telephony, the applications are quite broader. In particular, the present invention is applicable for any circuit requiring AC impedance matching.

While the invention has been described with reference to the exemplary embodiments thereof, those skilled in the art will be able to make various modifications to the described embodiments of the invention without departing from the true spirit and scope of the invention.

What is claimed is:

1. An AC impedance matched circuit, comprising:
    a digital filter including a transfer function based on a desired output AC impedance; and
    a voltage controlled current source controlled by an output of said digital filter such that said voltage controlled current source emulates said desired output AC impedance.

2. The AC impedance matched circuit according to claim 1, further comprising:
    a reference impedance in parallel with said voltage controlled current source.

3. The AC impedance matched circuit according to claim 1, wherein:
    an output of said reference impedance is fed back as an input to said digital filter.

4. The AC impedance matched circuit according to claim 1, further comprising:
    a summer adapted to combine a transmit signal together with an output of said digital filter to collectively control said voltage controlled current source.

5. The AC impedance matched circuit according to claim 1, wherein:
    a gain of said digital filter is determined based on said desired AC impedance.

6. The AC impedance matched circuit according to claim 1, wherein:
    a gain of said digital filter is programmable.

7. The AC impedance matched circuit according to claim 1, wherein:
    said digital filter is a sigma delta filter.

8. The AC impedance matched circuit according to claim 7, wherein:
    said sigma delta filter is a first order sigma delta filter.

9. The AC impedance matched circuit according to claim 1, wherein:
    said digital filter operates on single bit digital samples.

10. The AC impedance matched circuit according to claim 1, wherein:
    said reference impedance is greater than or equal to a maximum desired AC impedance.

11. The AC impedance matched circuit according to claim 1, wherein:
    said reference impedance is connected in parallel with said voltage controlled current source.

12. A method of matching AC impedance, comprising:
    digitally filtering an input signal using a transfer function based on a desired AC impedance;
    controlling a voltage controlled current source with said digitally filtered signal such that said voltage controlled current source emulates said desired AC impedance.

13. The method of matching AC impedance according to claim 12, further comprising:
    developing a voltage across a reference impedance with said current output from said voltage controlled current source.

14. The method of matching AC impedance according to claim 12, further comprising:
    adding a transmit signal to said control signal before controlling said voltage controlled current source.

15. The method of matching AC impedance according to claim 12, wherein:
    said digital filtering is performed with a sigma delta filter.

16. The method of matching AC impedance according to claim 12, further comprising:
    setting a gain of said digital filter based on a desired AC impedance.

17. Apparatus for matching AC impedance, comprising:
  means for digitally filtering an input signal using a transfer function based on a desired AC impedance; and
  means for controlling a voltage controlled current source with said digitally filtered signal such that said means for controlling a voltage controlled current source emulates said desired AC impedance.

18. The apparatus for matching AC impedance according to claim 17, further comprising:
  means for developing a voltage across a reference impedance with said current output from said voltage controlled current source.

19. The apparatus for matching AC impedance according to claim 17, further comprising:
  means for adding a transmit signal to said control signal before controlling said voltage controlled current source.

20. The apparatus for matching AC impedance according to claim 17, wherein said means for digital filtering comprises:
  a sigma delta filter.

21. The apparatus for matching AC impedance according to claim 17, further comprising:
  means for setting a gain of said digital filter based on a desired AC impedance.

* * * * *